UNITED STATES PATENT OFFICE.

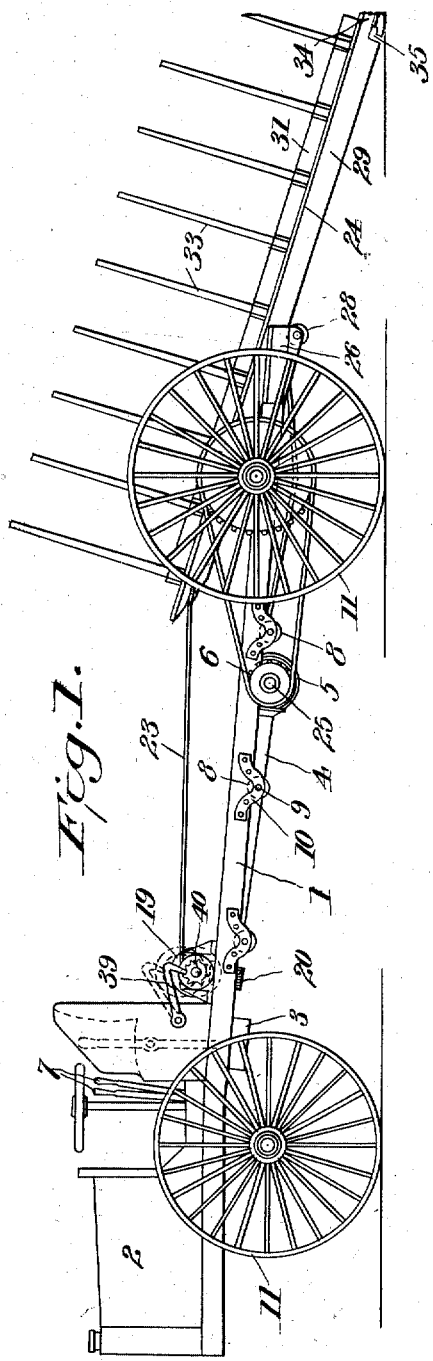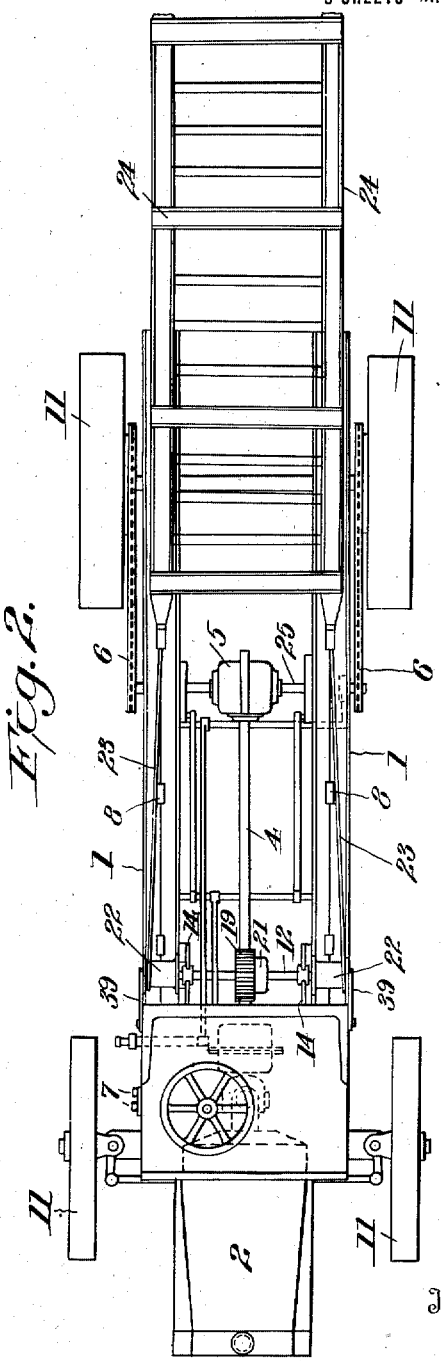

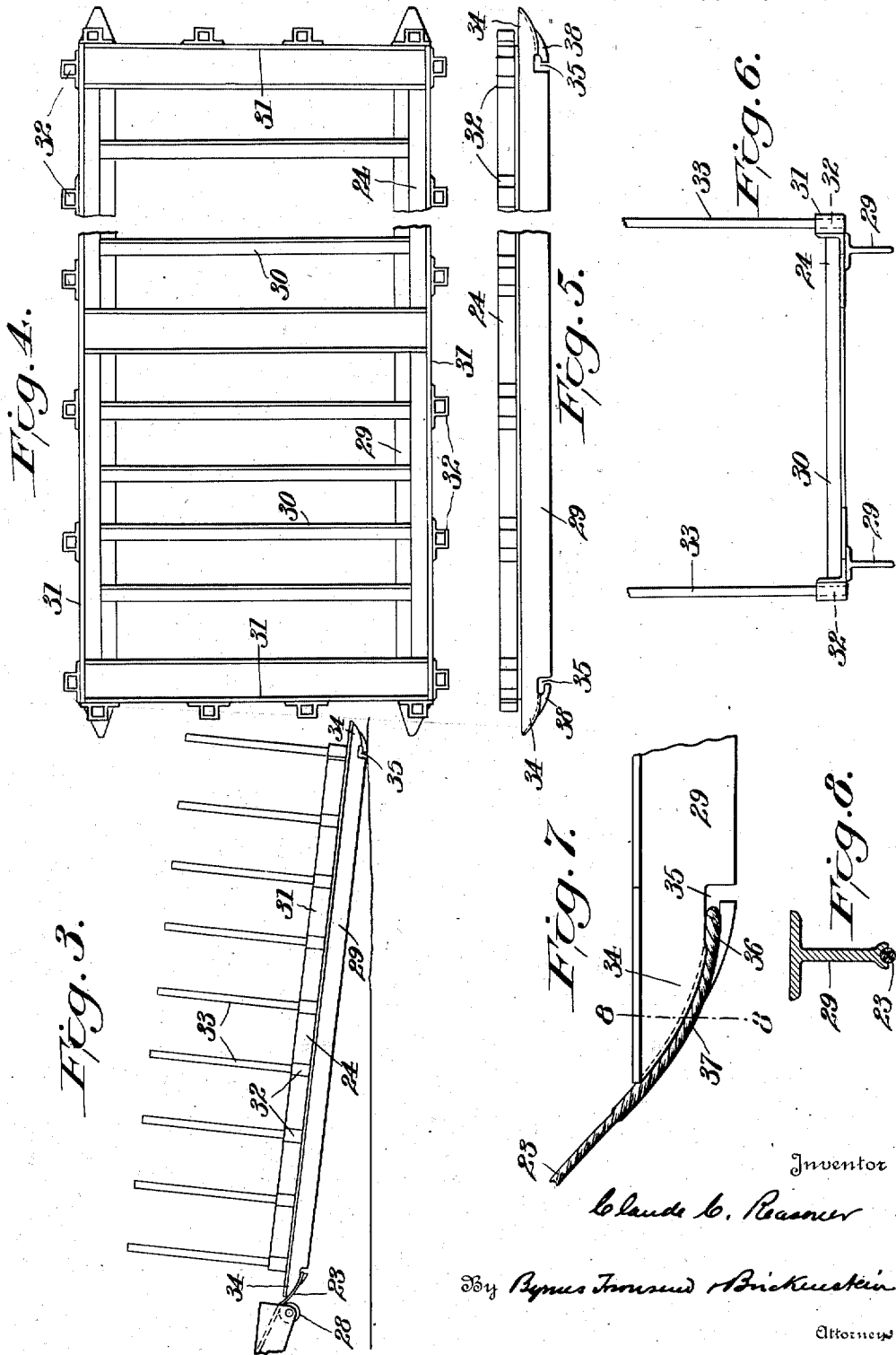

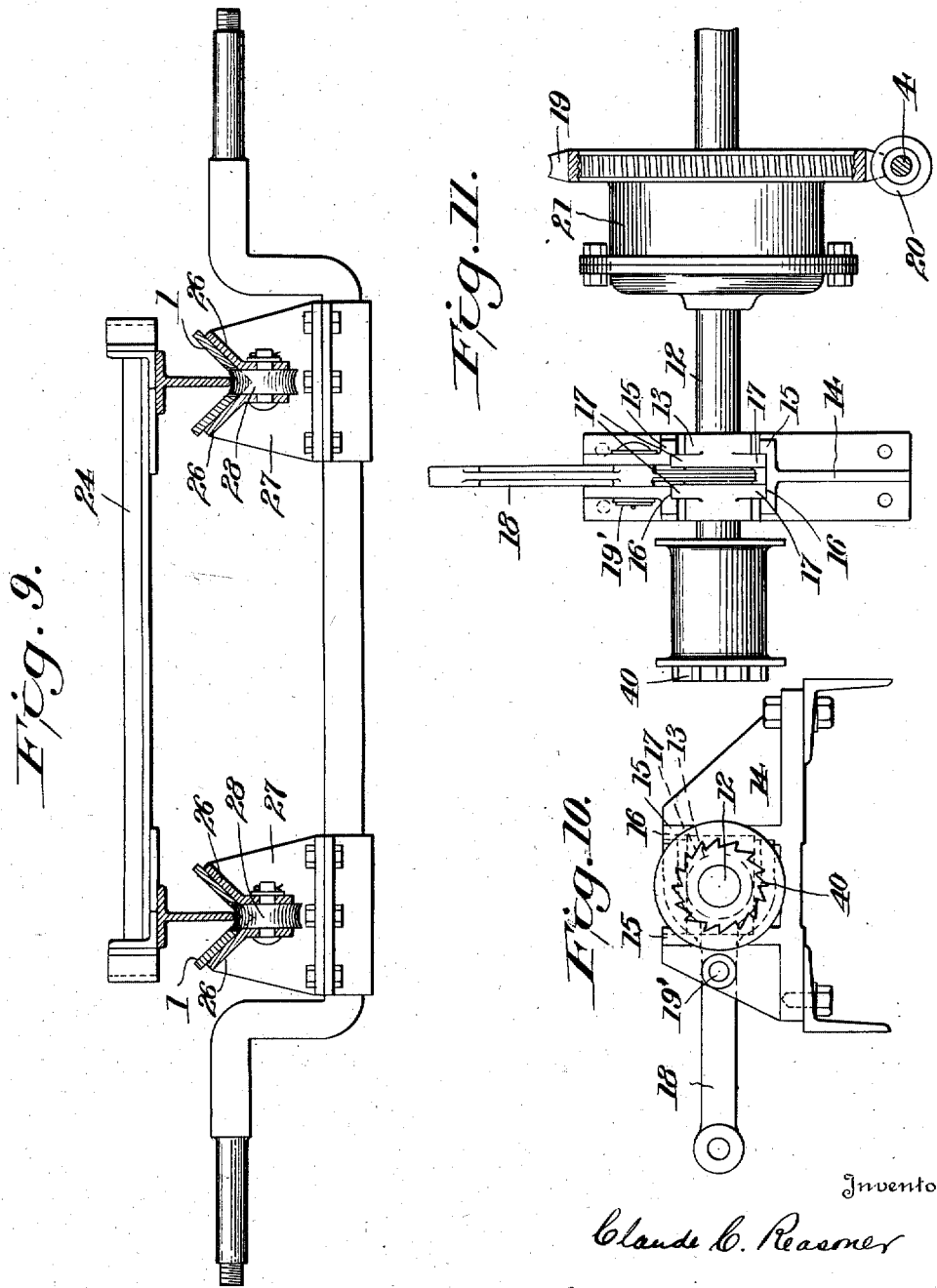

CLAUDE C. REASONER, OF HABANA, CUBA, ASSIGNOR TO CUBA SELF LOADING CANE TRUCK CORPORATION, OF NEW YORK, N. Y., A CORPORATION OF NEW YORK.

MOTOR-TRUCK FOR CANE-HAULING.

1,250,505.     Specification of Letters Patent.     Patented Dec. 18, 1917.

Application filed October 18, 1916. Serial No. 126,351.

*To all whom it may concern:*

Be it known that I, CLAUDE C. REASONER, a citizen of the United States, residing at Habana, Cuba, have invented certain new and useful Improvements in Motor-Trucks for Cane-Hauling, of which the following is a specification.

This invention relates to motor-trucks for cane-hauling, and is especially designed and constructed for conveying sugar-cane from the fields, either to the mill or to the loading-station from which it is transferred to railroad cars.

The object of the invention is to provide hauling-mechanism of this class which will follow in its general characteristics the ordinary trucks designed for heavy work, but which can be successfully operated in heavy, miry land so frequently encountered on the large sugar plantations, notably in Cuba. Dumping-trucks of various kinds have been tried heretofore for this class of work but for certain reasons they have all failed to give satisfactory results. The device of the present invention, unlike those heretofore known, is designed to meet the peculiar conditions of operation prevailing in hauling sugar-cane and analogous commodities.

Briefly, the invention comprises a motor-truck provided with a demountable body which can be completely detached from the chassis to permit of its being left in one part of a field for loading while the truck proper is moved to another part of the field to pick up a body similar to the first which has in the meantime received its load. The invention further comprises mechanism for facilitating proper mounting of a body on the chassis from positions in which the body is not in strict alinement with the chassis, a condition commonly occurring in sugar-fields. The invention also comprehends a body-construction such that the body can be dropped almost anywhere and picked up from that position with ease, without the employment of troublesome rollers on the rails of the body. Other features, such as the means for connecting and disconnecting the power-plant and the operating mechanism and the manner in which the tug-cable is connected to the rails of the body, also form part of the invention, as will hereinafter appear.

The mechanism is simple in construction and operation, its parts being substantially all standard, comparatively inexpensive to manufacture, and yet entirely sure in operation under quite adverse conditions.

The invention is illustrated in the accompanying drawings, wherein:

Figure 1 shows in side elevation the truck with its body partly lowered;

Fig. 2 is a plan view of the same;

Fig. 3 is a side view of the body with its front end raised and about to be drawn up onto the chassis;

Fig. 4 is a plan view of a body;

Fig. 5 is a side view thereof;

Fig. 6 is a rear view of the same;

Fig. 7 is an enlarged view of the forward end of one of the skids or side-rails of the body, showing how the tug-rope or cable is attached.

Fig. 8 is a section along the line 8—8 of Fig. 7;

Fig. 9 is a sectional view taken transversely through the rear of the truck, in front of the rear axle, looking rearward, some of the parts being shown in elevation and some being omitted for clearness;

Fig. 10 is an end view of part of the winding mechanism; and

Fig. 11 is a plan view of half of the hoisting mechanism.

As illustrated, the mechanism comprises a truck-chassis 1, having the usual motor within the hood 2, a clutch and transmission mechanism 3, a power-transmitting shaft 4, a differential 5, a chain and sprocket or other suitable driving means 6 and control-levers 7.

The chassis irons 1, as best shown in section in Fig. 9, are of V-shape, and may be formed of any standard angle-iron having sufficient strength to stand the strains incident to the work. The bottom of the V is cut away at intervals to allow the projection therethrough of two, three or more pairs of peripherally grooved rollers 8, having their supporting-pins 9 mounted in U-shaped straps or stirrups 10 riveted or bolted to the angle-irons 1.

The wheels 11 of the truck are of relatively large diameter and tread-surface, especially the rear wheels, and are preferably of "electric steel."

Carried transversely of the chassis near its forward end is a cross-shaft assembly 12 (see Figs. 10 and 11), mounted near each end in a non-rotatable sleeve 13 by which it is supported in suitable bearing-blocks 14 of which one only is shown in Fig. 11. The block 14 is secured by bolts or in any other suitable manner to the rails of the chassis 1. The vertical portions or standards of the bearing-blocks 14 are formed with transverse extensions 15 having their inner faces vertically grooved at 16 to provide guideways for the reception and guidance of squared extensions 17 on sleeves 13. Levers 18, extending forward of the truck from the standards 14 in which they are pivotally supported by pivot-pins 19', have forked rear ends receiving between the tines thereof the central portions of the sleeves 13 between the squared extensions 17. The more forward of the extensions 15 are divided to accommodate the lever 18. The forward ends of the levers 18 may be preferably connected and a suitable handle or pedal may be provided in proximity to the driver's seat, whereby the levers 18 may be operated in unison to raise and regulate the lowering of the sleeves 13 and therefore the members of the cross-shaft assembly 12 to control the connection of the latter with the power-plant, which will be presently understood.

Coupled to the ends of the cross-shaft members 12, and lying in the plane of the power-transmission shaft 4, there is a toothed wheel 19, the teeth whereof, when the shaft-assembly 12 is permitted to lower by release of the levers 18, engage a worm 20 on the transmission-shaft 4 and thus connect the motor with the shaft-assembly 12 to rotate the latter. Accompanying the toothed wheel 19 there is a suitable differential 21 which permits relative rotation between winding-drums 22 on the outer ends of the cross-shaft members 12, in the well-known manner. About the drums 22 wind and unwind the cables or ropes 23 one end of each of which is secured to one of the drums while the rear or free ends are detachably connected to the front ends of the body 24 in a novel manner presently to be described.

The differential 5 of the truck is mounted on the jack-shaft assembly 25, in the usual manner, except that a clutch-connection of any suitable type and not illustrated in detail is interposed between the driving means 6 and the transmission-shaft 4 to enable the latter to turn independently of the wheels. This clutch (not shown) may be operated by and simultaneously with the levers 18, to disconnect driving mechanism 6 from the shaft 4 when the shaft 12 and gear 19 are lowered to engage the worm on shaft 4 and to connect driving mechanism 6 to shaft 4 when shaft 12 and gear 19 are raised out of contact with the said worm.

The rear ends of the rails of the chassis are provided with reinforcing plates 26 bolted together to form central V-shaped portions providing seats for the chassis-irons 1. 27, 27 indicate saddle plates for supporting the chassis upon the rear axle. A pair of grooved rollers 28 similar to the rollers 8 are supported as shown in Figs. 1 and 9 in the rearmost parts of the plates 26. This reinforcement is quite desirable since at times in the loading-operation substantially all of the weight of the body and its load, approximating five tons, is carried by this rear-end construction.

The body proper 24 comprises two or more longitudinal rails or runners 29, of standard T-iron, webs down, and suitable cross-stays 30 of angle or other standard shape metal. Side- and end-pieces 31 are suitably secured along the tops of the runners and across their ends, and sockets 32 are provided therein at intervals for the reception of the lower ends of posts 33.

The forward ends of the runners 29 are cut off, pressed or rolled to form upwardly turned noses 34 and the lower edges of the metal forming the noses are flattened slightly and grooved as shown in Fig. 8 to form seats for the cables 23. Where the grooved lower edges of the nose portions join the edges of the rest of the rails 29, right-angle or offset slots 35 are cut in the metal, extending upward a slight distance and then forward, as shown in Figs. 5 and 7. The rear ends of the cables 23 are looped and spliced as indicated in Fig. 7 and are connected to the runners 29 by hooking the loops 36 in the slots 35. The splicings 37 then lie in the grooves along the bottoms of the nose-portions 34. It may also be desirable to cut away some of the metal from the sides of the runners as indicated at 38, Fig. 5, to enable the sides of the loops to flatten slightly and thus facilitate the spliced portions properly engaging in the grooves of the nose-portions. Obviously both ends of the runners may be provided with upwardly turned noses and means for attaching cables thereto.

In operation, several of the demountable bodies are supplied to a field or plantation, and these are scattered along the ground in the most suitable places. Assuming that the truck has just been emptied of its load at a loading or railway station, it is run to the part of the field where one of the bodies has been loaded with sugar-cane. There the empty body now on the chassis is allowed to slide from the chassis to the ground, the loops 36 of the cables 23 having been unhooked from the slots 35; and the truck is then moved to a position in front of and in approximately alinement with another body which has been loaded in the meantime. The loops 36 are thereupon hooked into the slots 35 of this body, the levers 18 released so as to permit the toothed-wheel 19 to engage with the worm 20 on the power-transmission shaft 4. The drums 22 will thereupon turn to wind upon them the cables 23, and the body will be dragged up onto the chassis over the rear rollers 28. It will be noted that in this operation the heavy spliced portions 37 of the cables will form a sort of track for the nose portions 34 of the runners 29 as the front ends of the runners approach and ride over the rollers 28, and the V-shaped chassis irons insure the proper positioning of the bottoms of the webs of the runners 29 on the rollers 28 and 8 as the body is drawn forward upon the chassis.

The levers 18 are then moved downward (see Fig. 10) to disconnect the toothed-wheel 19 from the worm on shaft 4 and to connect the driving mechanism 6 to transmission shaft 4. The pawls 39 prevent the rotation of the drums 22 in the body-releasing direction. The truck will then proceed to the loading station to discharge its load of cane, and return as before.

I claim:—

1. In a device of the class described comprising a truck and a body adapted to be placed on and removed from the truck, the combination of elements at the end of the truck having a rounded surface, a winding mechanism at the forward end of the truck, ropes connected to the said winding mechanism and leading over said rounded surface and means for attaching the free ends of the ropes to the body at the underside of the front end thereof.

2. In a device of the class described comprising a truck, and a body adapted to be placed on and removed from the truck, the combination of roller mechanism at the rear end of the truck, winding mechanism at the front end of the truck, ropes on said mechanism leading over the roller mechanism and means for attaching the free end of the ropes to the body at the underside of the front end thereof.

3. In a device of the class described comprising a truck and a body adapted to be placed on and removed from the truck, the combination of roller mechanism at the rear end of the truck, winding mechanism at the front end of the truck, ropes on said winding mechanism leading over the roller mechanism, channels in the underside of the front face of the body to receive the ropes and means for attaching the free end of the ropes to the body.

4. In a device of the class described comprising a truck and a body adapted to be placed on and removed from the truck, the combination of roller mechanism at the rear end of the truck, winding mechanism at the front end of the truck, ropes on said winding mechanism leading over the roller mechanism, the lower face of the body being upwardly curved to present a rounded nose to the truck, grooves in said curved face adapted to receive the free ends of the ropes and means for attaching the free end of the ropes in said grooves.

5. In a device of the class described comprising a truck and a body adapted to be placed on and removed from the truck, the combination of roller mechanism at the rear end of the truck, winding mechanism at the front end of the truck, ropes on said winding mechanism leading over the roller mechanism, the lower face of the body being upwardly curved to present a rounded nose to the truck, grooves in said curved face adapted to receive the free ends of the ropes, and a bayonet slot intercepting each of said grooves for securing the free ends of the ropes.

6. A hauling truck comprising a chassis having substantially V-shaped side rails, a removable body having longitudinal runners with vertical webs adapted to slide in said V-shaped side rails, winding drums at the forward end of the truck, ropes on the drums and means for attaching the free ends of the ropes to the lower edge of said runners at the front end thereof.

7. A hauling truck comprising a chassis having substantially V-shaped side rails, a removable body having longitudinal runners with vertical webs adapted to slide in said V-shaped side rails, winding drums at the forward end of the truck, rollers at the rear end of the truck substantially in alinement with the said V-shaped side rails, ropes on the drums leading over said rollers and means for attaching the free end of the ropes to the lower edge of said runners at the front end thereof.

8. A hauling truck comprising a chassis having substantially V-shaped side rails, a removable body having longitudinal runners with vertical webs adapted to slide in said V-shaped side rails, winding drums at the forward end of the truck, rollers at the rear end of the truck substantially in alinement with the said V-shaped side rails, ropes on the drums leading over said rollers, grooves in the lower face of said runners adapted to receive the free ends of the ropes and means for attaching the free end of the ropes in said grooves.

9. A hauling truck comprising a chassis having substantially V-shaped side rails, a removable body having longitudinal runners with vertical webs adapted to slide in said V-shaped side rails, winding drums at the forward end of the truck, rollers at the rear end of the truck substantially in alinement with the said V-shaped side rails, ropes on the drums leading over said rollers, grooves in the lower face of said runners adapted to receive the free ends of the ropes and bayonet slots intercepting said grooves for securing the ropes.

10. A hauling truck comprising a chassis having substantially V-shaped side rails, winding drums at the forward end of the truck substantially in alinement with the V-shaped rails, rollers in the bottom of the V-shaped side rails, rollers at the rear end of the truck substantially in alinement with the V-shaped side rails and ropes connected to the said drums and leading over said last mentioned rollers, a loading frame, vertical webs extending from the lower face of said frame and means for connecting the ropes to the lower edge of said webs at the front end thereof.

11. A hauling truck comprising a chassis having substantially V-shaped side rails, substantially V-shaped supports for the said rails mounted on the rear axle and adapted to brace the rear end of said rails and rollers mounted on said supports to project above the bottom of the rails and beyond the end of the rails.

12. A hauling truck comprising a chassis having substantially V-shaped side rails, rollers mounted on said rails to project above the bottom thereof, V-shaped supports for the said rails mounted on the rear axle and adapted to brace the rear end of the rails and rollers mounted on said supports to project above the bottom of the rails and beyond the end of the rails.

13. A hauling truck comprising rollers at the rear end thereof, a loading frame, winding drums at the front end of the truck, ropes leading from the drums over the rollers to the lower face of said frame and differential gearing between the said drums for equalizing the strain in the two ropes.

14. In a device of the class described comprising a truck and a frame adapted to be placed on and removed from the truck and having a free transverse front edge, the combination of elements at the extreme end of the truck having a rounded surface, a winding mechanism at the forward end of the truck, ropes connected to the said winding mechanism and leading over said rounded surface and means for attaching the free ends of the ropes to the front edge of the frame.

15. In a device of the class described comprising a truck and a frame adapted to be placed on and removed from the truck and having a free transverse front edge, the combination of elements at the end of the truck having a rounded surface, the front end of the frame being tapered upwardly, a winding mechanism at the forward end of the truck, ropes connected to the said winding mechanism and leading over said rounded surface and means for attaching the free ends of the ropes to the front edge of the frame.

In testimony whereof I affix my signature.

CLAUDE C. REASONER.

Correction in Letters Patent No. 1,250,505.

It is hereby certified that in Letters Patent No. 1,250,505, granted December 18, 1917, upon the application of Claude C. Reasoner, of Habana, Cuba, for an improvement in "Motor-Trucks for Cane-Hauling," an error appears in the printed specification requiring correction as follows: Page 3, line 53, claim 3, for the word "face" read *end;* and that the said Letters Patent should be read with this correction therein that the same may conform to the record of the case in the Patent Office.

Signed and sealed this 5th day of February, A. D., 1918.

[SEAL.]

R. F. WHITEHEAD,
*Acting Commissioner of Patents.*

Cl. 21—20.